United States Patent [19]
Lohde

[11] Patent Number: 5,983,826
[45] Date of Patent: Nov. 16, 1999

[54] FLUID CONTROL VALVE HAVING MECHANICAL PRESSURE INDICATOR

[75] Inventor: Dan Lohde, Aliso Viejo, Calif.

[73] Assignee: The Toro Company, Riverside, Calif.

[21] Appl. No.: 08/895,843

[22] Filed: Jul. 18, 1997

Related U.S. Application Data

[63] Continuation of application No. 08/576,947, Dec. 22, 1995, abandoned.

[51] Int. Cl.[6] ............................... F16K 37/00; G09F 9/00
[52] U.S. Cl. ............................. 116/277; 116/309
[58] Field of Search ............................. 74/553; 116/277, 116/291, 309, 310, 311, 312, 313, 314, 315, 316, 317, 318, 319, 320

[56] References Cited

U.S. PATENT DOCUMENTS

| | | |
|---|---|---|
| 450,451 | 4/1891 | Ferrell . |
| 574,768 | 1/1897 | Walsh, Jr. . |
| 1,235,767 | 8/1917 | Clark . |
| 1,907,819 | 5/1933 | Hutchings . |
| 2,367,651 | 1/1945 | Stone ....................................... 116/277 |
| 2,379,517 | 7/1945 | Hadden .................................. 116/277 |
| 2,407,944 | 9/1946 | Bassett .................................... 116/277 |
| 2,418,727 | 4/1947 | Rosenston et al. . |
| 2,599,286 | 6/1952 | Rockwell . |
| 2,767,681 | 10/1956 | Pontius . |
| 3,554,160 | 1/1971 | Fortune et al. ......................... 116/277 |
| 3,785,338 | 1/1974 | Visser . |
| 4,133,288 | 1/1979 | Burgess .................................. 116/277 |
| 4,411,288 | 10/1983 | Gain, Jr. ................................. 137/363 |
| 4,655,160 | 4/1987 | Ligh ....................................... 116/277 |

*Primary Examiner*—Hezron Williams
*Assistant Examiner*—Willie Morris Worth
*Attorney, Agent, or Firm*—Richard L. Myers

[57] ABSTRACT

A mechanical pressure gauge indicator for showing a position of a multi-turn non-rising water valve stem is disclosed. The mechanical pressure gauge indicator uses 180 degrees of turning motion to indicate various approximations of pressure downstream of the regulating valve. One half turn of the mechanical simulated pressure gauge indicator indicates ten turns of the multi-turn non-rising water valve stem.

7 Claims, 4 Drawing Sheets

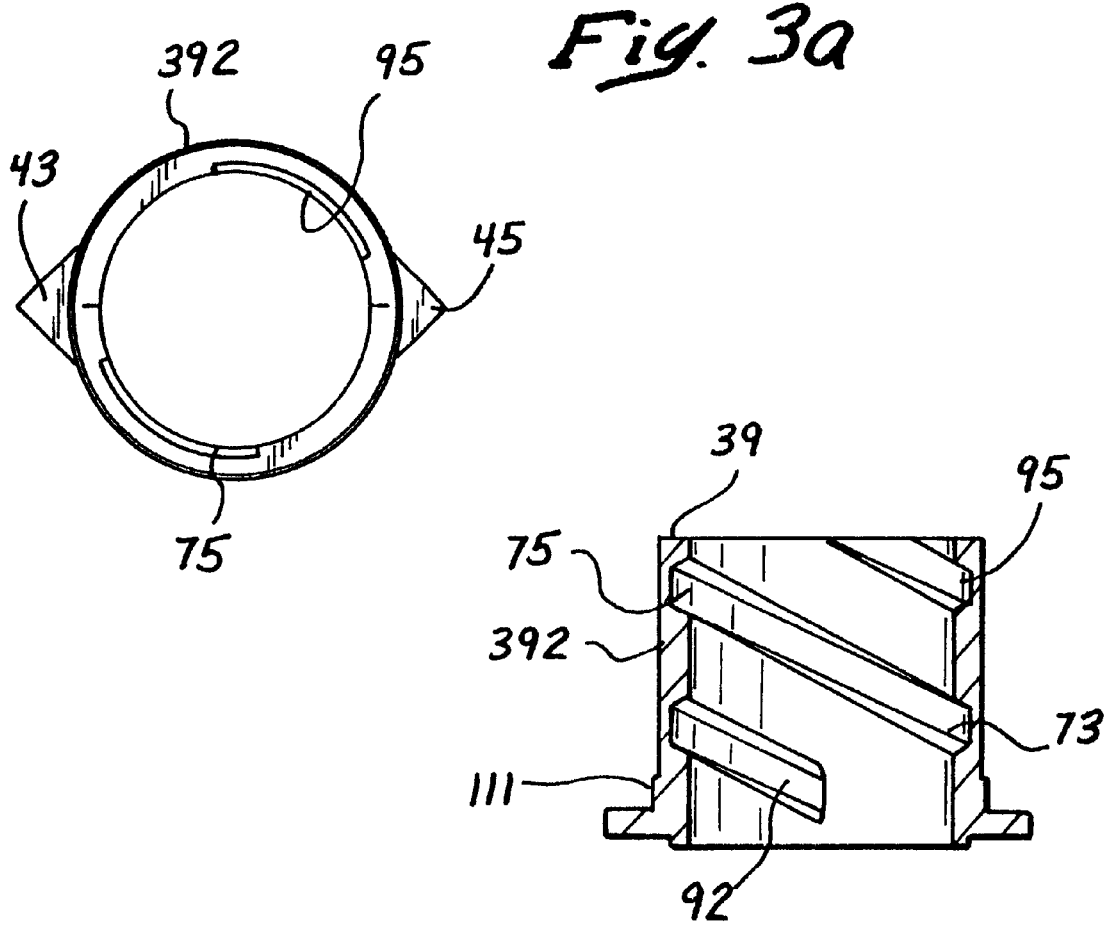
Fig. 3a
Fig. 3b
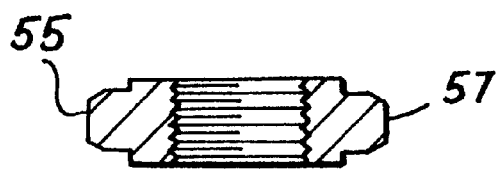
Fig. 4a
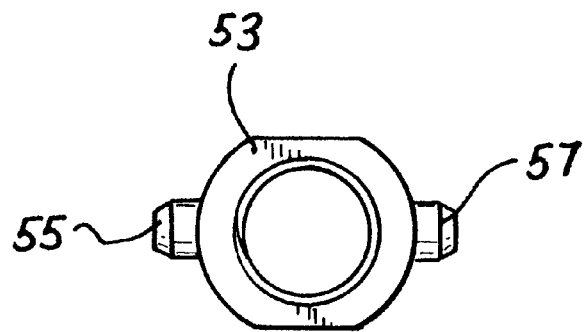
Fig. 4b

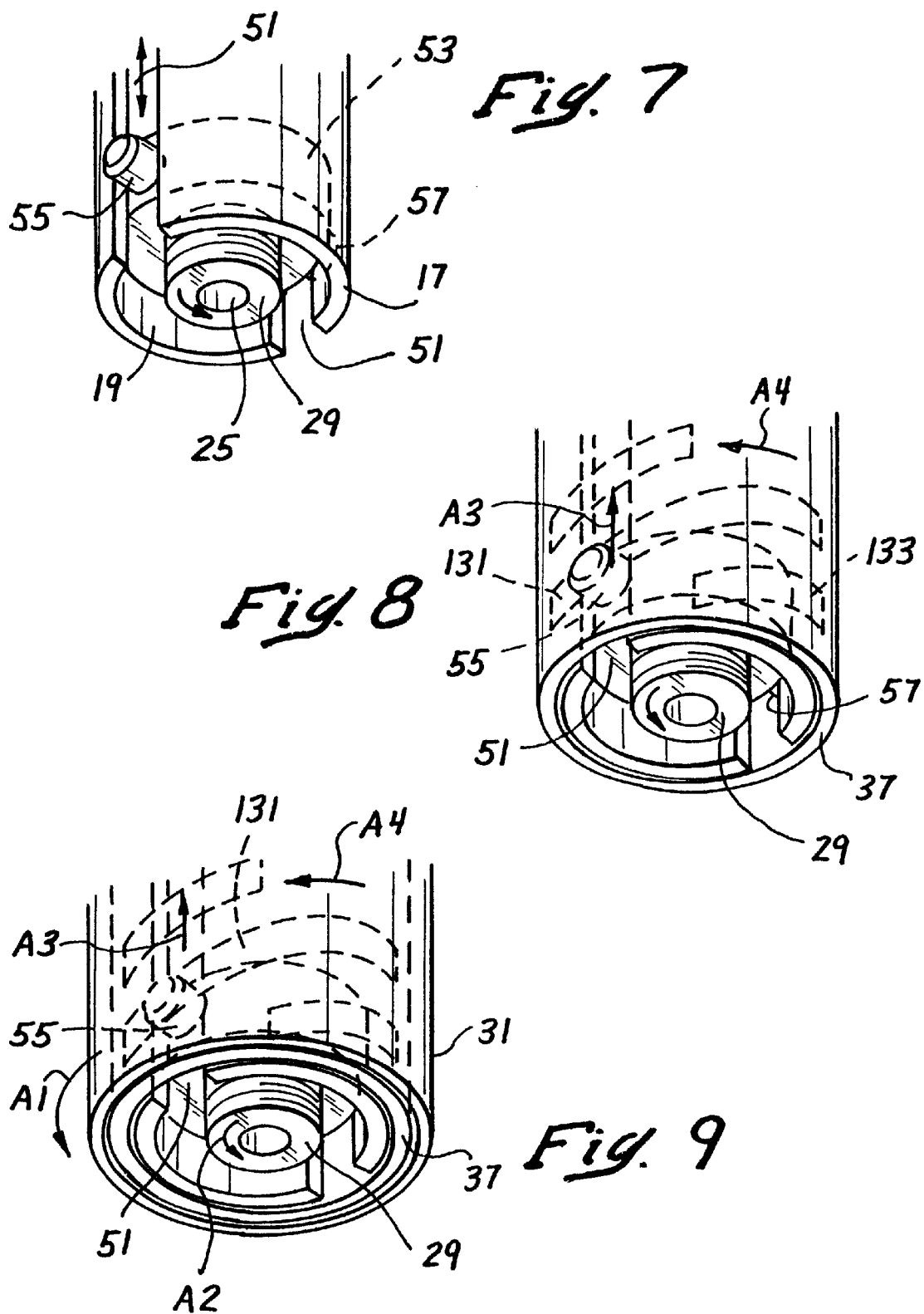

ns,826

FLUID CONTROL VALVE HAVING MECHANICAL PRESSURE INDICATOR

This is a continuation, of application Ser. No. 08/576,947, filed Dec. 22, 1995 now abandoned.

BACKGROUND OF THE INVENTION

The present invention relates generally to pressure gauge indicators and, more particularly, to a mechanical single-turn indicator for showing the position of a multiple-turn actuator which might be used for example, in a regulating valve for regulation of downstream pressure.

Regulating valves are used in the irrigation industry for maintaining a predetermined downstream pressure. The regulating valve receives a small pilot supply of water from a main fluid supply valve. The regulating valve controls the pressure within a closure chamber of the main fluid supply valve, to thereby cause the main fluid supply valve to pass water from an upstream pipe to a downstream pipe when a pressure in the downstream pipe falls below a predetermined pressure. The flow of water through the main fluid supply valve is thus controlled by the regulating valve to achieve a desired downstream pressure.

In order to determine whether the desired downstream pressure has been achieved, a pressure gauge can be attached to the regulating valve to thereby indicate the downstream pressure. Since pressure gauges can be expensive, a common practice in the irrigation industry is to attach a Schrader valve to the regulating valve. The Schrader valve can accommodate a pressure hose gauge assembly, which can be connected to the Schrader valve for downstream pressure checks and adjustments.

Although use of a Schrader valve in combination with a regulating valve can be cost effective, this combination can also be labor intensive. During system checks, walk throughs, and other procedures where the downstream pressure of a regulating valve needs to be monitored, the user must carry the pressure hose gauge assembly and manually attach the pressure hose gauge assembly to each Schrader valve before reading the downstream pressure of the regulating valve. Thus, the user can only determine the downstream pressure of the regulating valve after connecting the pressure hose gauge assembly to the Schrader valve. A simple task of checking the downstream pressures of 10 regulating valves can consume a large amount of time, when the user is forced to attach the pressure hose gauge assembly to the Schrader valve of each regulating valve before reading the pressure of that regulating valve.

Another solution proposed by the prior art involves fitting the pressure gauge directly onto either the regulator valve or the downstream pipe. This solution, however, usually requires a significant financial expenditure for purchasing a pressure gauge and regulating valve combination. Such a combination of a pressure gauge and regulating valve is typically about double the cost of the above-mentioned Schrader valve and pressure hose gauge assembly combination. Additionally, many contractors do not recommend putting a sensitive pressure gauge into the regulating valve box.

U.S. Pat. No. 2,379,517 to E. L. Haden, issued on Jul. 3, 1945, discloses a universal indicator for remote controlled deck sockets. The indicator is basically a two position indicator for communicating whether a valve is in an open or closed position. This device uses an annular nut moveable relative to a rotatable spindle and having a single pin attached thereto.

When the spindle is rotated, the pin of the nut travels along a single helical slot to rotate a stationary sleeve. As the pin travels within the helical slot of the stationary sleeve, the pin also exerts a rotational force on a corresponding vertical slot of a corresponding oscillating sleeve.

Only the single pin, and the corresponding single helical slot are used, to rotate the oscillating sleeve. As a result, rotational force is only applied to a single point of the oscillating sleeve. Application of the rotational force to the oscillating sleeve at only a single point tends to cause an imbalanced motion, and further results in a frictional operation.

Another shortcoming of this prior art apparatus is the positioning of the helical slot on the stationary sleeve and the positioning of the vertical slots on the oscillating sleeve. Since the purpose of the pin of the annular nut is to rotate the oscillating sleeve with minimal friction, placement of vertical slots on the oscillating sleeve (as opposed to helical slots, for example) causes added friction. Thus, the primary sources of friction result from use of only a single pin of the annular nut, and from use of only a single vertical slot within the oscillating sleeve. The unbalanced forces resulting from use of only a single pin and a vertical slot may actually generate jamming forces.

Perhaps one result of this unbalanced force-application system of the prior art is the very limited range of motion of the index mark of the Haden device. Basically, this index mark moves within a range of approximately 30 degrees along a circle to indicate whether the valve is open or shut. The limited display of information, indicating only whether the valve is open or shut, is itself a shortcoming of the prior art as well. A device of simple and low-friction construction is thus needed for displaying a range of pressures of the regulating valve.

A result of the frictional operation of the Haden prior art device is that this device may need to be manufactured in metal parts and, further, may need to be lubricated to ensure proper operation. Metal parts can be expensive, subject to rust, and heavy. Lubrication of these metal parts can increase the complexity of the system for venting air from the spring side of the regulator diaphragm, for example.

A need has thus existed in the prior art for a compact, durable, and economically feasible pressure gauge indicator, which can be permanently affixed to regulating valve to thereby avoid the large expenditure of time associated with assembly and disassembly of Schrader-valve compatible pressure gauges.

SUMMARY OF INVENTION

The present invention discloses a mechanical simulated pressure gauge indicator for showing a position of a multi-turn non-rising water valve stem. The mechanical simulated pressure gauge indicator of the present invention does not merely use an approximately 30 degree range of indication to communicate whether a valve is open or shut but, instead, harnesses an entire 180 degrees of turning motion to indicate various approximations of pressure downstream of the regulating valve.

Moreover, the present invention uses two opposing indicator protrusions to indicate the pressure approximations in both domestic and international scale numbers. Both of these pressure indications are indicated simultaneously and in an easy to read format.

The present invention uses a pair of opposing protrusions for turning an indicator cylindrical sleeve. This pair of opposing protrusions slides within a corresponding pair of helix-dial cams and vertical tracks. In contrast to the prior art, the two opposing protrusions apply rotational force to the indicator cylindrical sleeve at two points instead of just one. The balanced application of rotational forces to the two points along the indicator cylindrical sleeve provides for a smooth rotation of the indicator cylindrical sleeve, with a small amount of friction.

Additionally, two semi-circular extensions of the regulating valve housing provide for the two vertical tracks. The two vertical tracks are stationary and direct a threaded shaft follower along an inner threaded shaft, while preventing any rotation of the threaded shaft follower. A purpose of the present invention is to rotate the indicator cylindrical sleeve, not the threaded shaft follower. The invention is thus unlike the universal indicator of the prior art system. As the threaded shaft follower of the present invention moves along the threaded shaft without rotating, two opposing protrusions of the threaded shaft follower move within a pair of helix dial cams to rotate the indicator cylindrical sleeve.

As the indicator cylindrical sleeve slowly rotates with each turn of the multi-turn adjustment knob, two ratchet protrusions of the multi-turn adjustment knob pass along outer surfaces of the indicator cylindrical sleeve. The outer surfaces of the indicator cylindrical sleeve have ridges thereon, and the ridges contact the ratchet protrusions of the multi-turn adjustment knob. With each contact of a ratchet protrusion on a ridge of the indicator cylindrical sleeve, radial frictional and impact forces are imparted onto the indicator cylindrical sleeve to assist rotation of the indicator cylindrical sleeve. In addition to imparting the radial frictional and impact forces to the indicator cylindrical sleeve, the ratchet protrusions generate a "ratcheting" feel, which is highly desirable among many users.

With the low friction resulting from use of the two opposing protrusions and corresponding helix-dial cams, and further with the assisted rotational forces imparted from the two ratchet protrusions, many parts of the present invention can be formed of an economical material. The present invention can be made of plastic parts, for example, since the strength of metal is not needed and, further, since grease or other lubrication is not needed.

Another advantage from the simple and effective design of the present invention is a very high dial-action ratio of 20–1 in an overall compact height travel of the two opposing protrusions.

According to one aspect of the present invention, a mechanical simulated pressure gauge indicator for use with a multi-turn non-rising water valve stem having a module housing and module housing indicia surface on the module housing indicates a state of a multi-turn adjustment knob with a one-half turn of the indicator cylindrical sleeve. The mechanical simulated pressure gauge indicator includes a multi-turn adjustment knob having a rotatable threaded inner shaft fitting around a bolt housing of a multi-turn non-rising water valve stem.

A bolt within the bolt housing rotates when the multi-turn adjustment knob is rotated. The mechanical simulated pressure gauge indicator further includes a threaded shaft follower, which fits around the threaded inner shaft, and which has two opposing protrusions extending radially from the outer surface of the threaded shaft follower. Two semi-circular extensions extend from the module housing indicia surface, and form two tracks therebetween.

Each of the two tracks accommodates a corresponding one of the two opposing protrusions and prevents the threaded shaft follower from rotating when it moves along the rotating threaded inner shaft. An indicator cylindrical sleeve having a double-start helix groove accommodates the two opposing protrusions. The two opposing protrusions move within the double-start helix groove cam, in addition to moving within the two tracks, to thereby cause the indicator cylindrical sleeve to rotate through one half of a turn when the multi-turn adjustment knob is rotated through a plurality of turns.

The indicator cylindrical sleeve contacts the module housing indicia surface, and the multi-turn adjustment knob contacts upper portions of the indicator cylindrical sleeve. The indicator cylindrical sleeve comprises a plurality of ridges running in a direction roughly parallel to the axis of the bolt, and first and second ratchet protrusions of the multi-turn adjustment knob contact these ridges when both the multi-turn adjustment knob and the indicator cylindrical sleeve are rotated.

As the ratchet protrusions pass over the ridges of the indicator cylindrical sleeve, they exert rotational forces on the indicator cylindrical sleeve to assist the indicator cylindrical sleeve in rotating. The two opposing protrusions moving within the double-start helix groove cam of the indicator cylindrical sleeve exert two separate rotational forces on the indicator cylindrical sleeve to thereby help balance the indicator cylindrical sleeve and prevent wear and jamming of the indicator cylindrical sleeve when the indicator cylindrical sleeve is rotated.

The multi-turn adjustment knob further includes an outer cylindrical sleeve, and an indicia bearing portion, which connects the outer cylindrical sleeve to the threaded inner shaft. Both the outer cylindrical sleeve and the threaded inner shaft are co-axial with the axis of the multi-turn non-rising water valve stem. When the outer cylindrical sleeve is rotated with a first rotational velocity, the threaded inner shaft rotates with the same rotational velocity, as imparted by the indicia bearing portion connecting the two together.

The multi-turn adjustment knob is rotatable in both clockwise and counterclockwise directions. When the multi-turn adjustment knob is rotated in the clockwise direction, the threaded shaft follower is moved toward the indicia-bearing portion of the multi-turn adjustment knob. Similarly, when the multi-turn adjustment knob is rotated in the counter-clockwise direction, the threaded shaft follower is moved away from the indicia-bearing portion of the multi-turn adjustment knob. The indicator cylindrical sleeve moves in the same rotational direction as the multi-turn adjustment knob, but moves with a slower rotational speed.

According to another aspect of the present invention, the two tracks for accommodating the two opposing protrusions are both approximately parallel to an axis of the threaded inner shaft. The two tracks prevent the threaded shaft follower from rotating when the multi-turn adjustment knob is rotated in either the clockwise or the counterclockwise direction. The indicator cylindrical sleeve fits around the threaded shaft follower, and has an outer surface with two indicator protrusions positioned thereon. The inner surface of the indicator cylindrical sleeve has the double-start helix groove cam position thereon. Each of the two opposing protrusions fits within one of the two tracks and also fits within one of the two helix dial cams of the double-start helix groove cam.

When the multi-turn adjustment knob is rotated, the two opposing protrusions of the threaded shaft follower move within the two tracks in the direction which is generally parallel to the threaded inner shaft. Movement of the threaded shaft follower in the direction which is generally parallel to the threaded inner shaft causes the two opposing protrusions to move within the double-start helix groove cam. Movement of the two opposing protrusions within the double-start helix groove cam causes the indicator cylindrical sleeve to rotate. The indicator cylindrical sleeve is capable of indicating the state of the multi-turn adjustment knob with less than a single rotation and, preferably, one-half rotation, of the indicator cylindrical sleeve.

The multi-turn adjustment knob of the present invention turns without any need for oil or grease, and further does not require a true bearing. With the elimination of grease from the pressure gauge indicator of the present invention, a simplified mechanism for venting air through the area of the pressure gauge indicator from the spring side of the regular diaphragm can be implemented.

The present invention, together with additional features and advantages thereof, may best be understood by reference to the following description taken in connection with the accompanying illustrative drawings.

BRIEF DESCRIPTION OF DRAWINGS

FIG. 3a is a top view of the indicator cylindrical sleeve of the presently preferred embodiment;

FIG. 3b is a cross-sectional view of the indicator cylindrical sleeve of the presently preferred embodiment;

FIG. 4a is a cross-sectional view of the threaded shaft follower of the presently preferred embodiment;

FIG. 4b is a top plan view of the threaded shaft follower of the presently preferred embodiment;

FIG. 7 is a schematic representation of the inner threaded shaft, the threaded shaft follower, and the two semi-circular extensions of the module housing according to the present invention;

FIG. 8 is a schematic representation of the elements of FIG. 7 with the additional indicator cylindrical sleeve added thereto; and FIG. 9 is a schematic representation of the elements of FIG. 8 with the additional multi-turn adjustment knob added thereto.

DETAILED DESCRIPTION OF THE PRESENTLY PREFERRED EMBODIMENT

Figure 1:
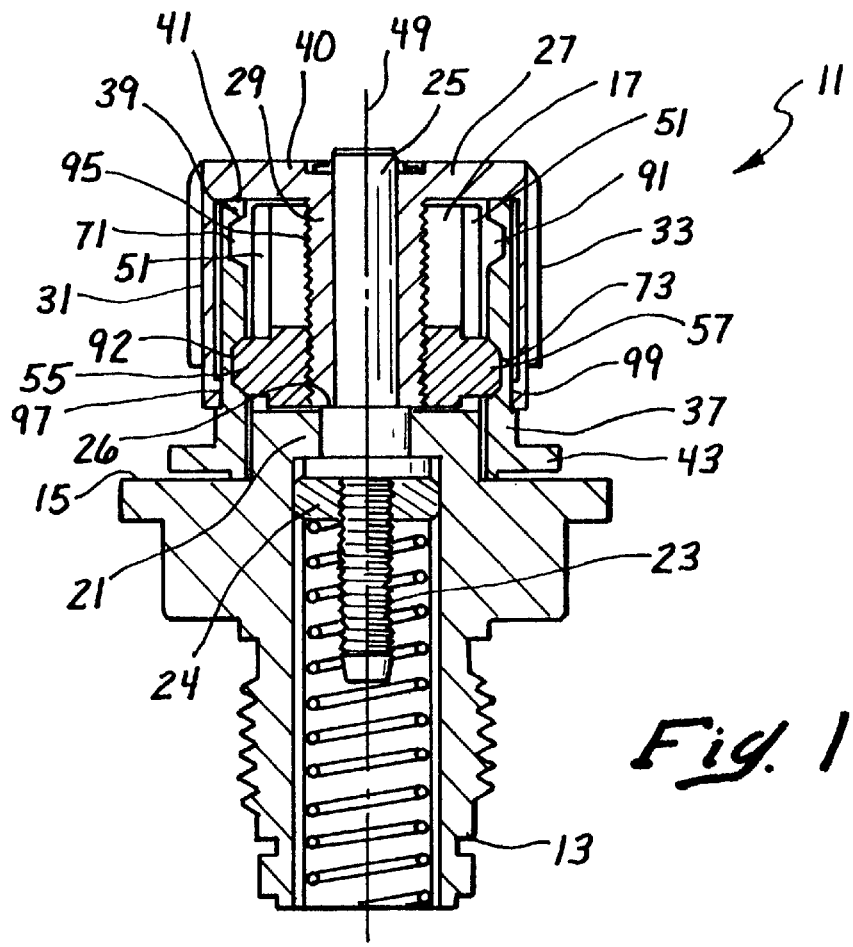
FIG. 1 is a cross-sectional view of the mechanical simulated pressure gauge indicator of the presently preferred embodiment.
Figure 2:
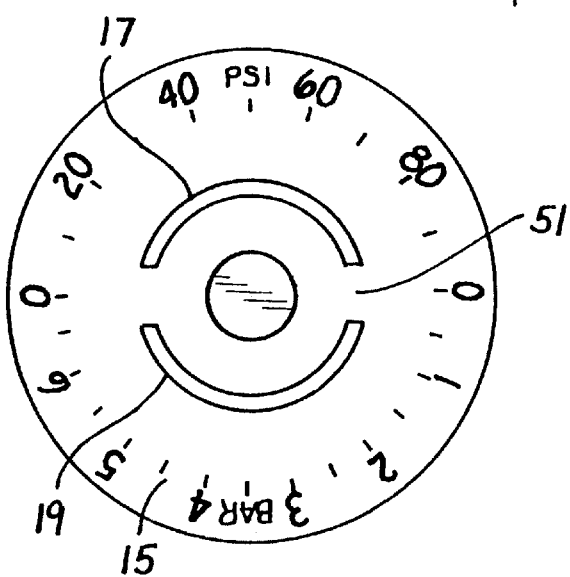
FIG. 2 is a top view of the module housing of the regulating valve of the presently preferred embodiment.

FIG. 1 shows a cross-sectional view of the mechanical simulated pressure gauge indicator 11 of the presently preferred embodiment. The mechanical simulated pressure gauge indicator 11 fits onto a module housing 13 of the regulating valve. The module housing 13 comprises a module housing indicia surface 15, a first semi-circular extension of the module housing 17, and a second semi-circular extension of the module housing 19 (FIG. 2). The module housing 13 further comprises module housing support surfaces 21. A bolt 23 and nut 24 assembly fit within a bolt housing 25 by means of a press fit.

A multi-turn adjustment knob 27 comprises an inner threaded shaft 29 for accommodating the bolt housing 25, and further comprises an outer cylindrical sleeve 31. The outer cylindrical sleeve 31 comprises a plurality of ribs 33. The ribs 33 allow a user to firmly grip the outer cylindrical sleeve 31 when rotating the multi-turn adjustment knob 27.

A user can rotate the multi-turn adjustment knob 27 in the clockwise direction to increase the downstream pressure of the regulating valve, and can rotate the knob 27 in the counterclockwise direction to decrease the downstream pressure of the regulating valve.

In the presently preferred embodiment, the inner threaded shaft 29 of the multi-turn adjustment knob 27 frictionally presses against the shoulder 26 of the bolt 23. This press fit between the bolt 23 and the inner threaded shaft 29 secures the adjustment knob 27 onto the module housing support surface 21. The press fit causes rotation of the multi-turn adjustment knob 27 to be transferred to the bolt 23. Accordingly, rotation of the multi-turn adjustment knob 27 causes the bolt 23 to rotate in the same direction and at the same speed as the multi-turn adjustment knob 27. In one alternative embodiment, the inner threaded shaft 29 rests against the module housing support surface 21, and a locking pin secures the multi-turn adjustment knob 27 onto the module housing support surface 21.

An indicator cylindrical sleeve 37 fits under the multi-turn adjustment knob 27. The indicator cylindrical sleeve 37 comprises an upper top surface 39 (FIG. 3b) for contacting the lower surface 41 of the indicia-bearing portions 40 of the multi-turn adjustment knob 27. The indicator cylindrical sleeve 37 further comprises a first indicator protrusion 43 and a second indicator protrusion 45. Lower portions of the first indicator protrusion 43 and the second indicator protrusion 45 contact the module housing indicia surfaces 15. Thus, the indicator cylindrical sleeve 37 is held between the indicia-bearing portions 40 of the multi-turn adjustment knob 27 and the module housing indicia surfaces 15 of the module housing 13.

In addition to the first cylindrical multi-turn adjustment knob 27, and the second indicator cylindrical sleeve 37, the two semi-circular extensions 17 and 19, also fit around the bolt housing 25. Thus, the multi-turn adjustment knob 27, the indicator cylindrical sleeve 37, and the two opposing semi-circular extensions of the module housing 17 and 19 are all concentric with the axis 49 of the bolt 23. The first semi-circular extension 17 and the second semi-circular extension 19 (not shown in FIG. 1), together form two tracks 51 (FIG. 2).

A threaded shaft follower 53 fits over the inner threaded shaft 29 of the multi-turn adjustment knob 27. The first opposing protrusion 55 extends from the threaded shaft follower 53 into a first one of the two tracks 51, and a second opposing protrusion 57 extends from the threaded shaft follower 53 into a second one of the two tracks 51 in the module housing 13. Each of the two tracks 51 are generally parallel to the axis 49 of the bolt 23.

The first opposing protrusion 55 of the threaded shaft follower 53 is shown in FIG. 1 fitting into a lower portion 92 of a first helix dial cam 91 located on the interior surface of the indicator cylindrical sleeve 37. The second opposing protrusion 57 of the threaded shaft follower fits into a lower portion 73 of a second helix dial cam 71 located on the interior surface of the indicator cylindrical sleeve 37. Thus, the first opposing protrusion 55 fits both into one of the tracks 51 of the module housing 13 and also into a lower portion 92 of the first helix dial cam 91, and the second opposing protrusion 57 fits both into the second one of the tracks 51 in the module housing 13 and also into the lower portion 73 of the second helix dial cam 71.

Since the first and second semi-circular extensions 17, 19 of the module housing 13 are fixed, the two tracks 51 are also fixed. Accordingly, when a user rotates the multi-turn adjustment knob 27 to thereby rotate the inner threaded shaft 29, the threaded shaft follower 53 tends to rotate in the same direction. Both the first opposing protrusion 55 and the second opposing protrusion 57 of the threaded shaft follower 53, however, prevent the threaded shaft follower 53 from rotating in the direction that the multi-turn adjustment knob 27 was rotated. Thus, the threaded shaft follower 53 is forced to move along the axis 49 of the inner threaded shaft 29, without rotating, according to the direction of rotation of the multi-turn adjustment knob 27.

When the threaded shaft follower 53 moves along the axis 49 of the inner threaded shaft 29, the first opposing protrusion 55 and the second opposing protrusion 57 of the threaded shaft follower 53 move in the same direction and at the same speed. These two opposing protrusions 55, 57 also move within the lower portion 92 of the first helix dial cam and the lower portion 73 of the second helix dial cam, respectively. When the user grips the ribs 33 and turns the multi-turn adjustment knob 27 in the clockwise direction, for example, the inner threaded shaft 29 rotates in the same direction and at the same speed. The threaded shaft follower 53 tends to rotate in the clockwise direction, as well, but is prevented from doing so by the tracks 51 in the module housing 13. The threaded shaft follower 53 thus moves along the axis 49 of the inner threaded shaft 29 in a direction toward the inner surface 41 of the multi-turn adjustment knob 27. Alternatively, when the multi-turn adjustment knob 27 is rotated in a counterclockwise direction, the threaded shaft follower 53 moves along the axis 49 in a direction away from the inner surface 41.

Movement of the threaded shaft follower 53 in a direction toward the inner surface 41 causes the first opposing protrusion 55 to move along the lower portion 92 of the first helix dial cam, and causes the second opposing protrusion 57 to move along the lower portion 91 of the second helix dial cam. If the multi-turn adjustment knob 27 continues to be rotated, these two opposing protrusion 55, 57 continue to move along the lower portions 91, 92, 73 of the first and second helix dial cams, respectively.

Since the helix dial cams of the indicator cylindrical sleeve 37 are helix-shaped, movement of the first opposing protrusion 55 and the second opposing protrusion 57, without rotation, along the axis 49 causes the indicator cylindrical sleeve 37 to rotate. In the presently preferred embodiment, the multi-turn adjustment knob 27 may be rotated through approximately ten rotations before the first opposing protrusion 55 is moved from the lower portion 92 of the first helix dial cam up to the upper portion 95 of the first helix dial cam. Similarly, in the presently preferred embodiment, ten rotations of the multi-turn adjustment knob 27-move the second opposing protrusion 57 from the lower portion 73 of the second helix dial cam up to the upper portion 75 of the second helix dial cam.

Movement of the first and second opposing protrusions 55, 57 from the lower portions 92, 73 to the upper portions 95, 75 of the first and second helix dial cams, respectively, causes the indicator cylindrical sleeve to rotate through approximately 180 degrees.

The 20-to-1 movement ratio, corresponding to a half rotation of the indicator cylindrical sleeve 37 for ten rotations of the multi-turn adjustment knob 27, can be adjusted by changing the multi-turn adjustment knob thread pitch 95 of the threaded shaft follower 53, and can also be varied by changing the slope of the first and second helix dial cams.

According to the present invention, a first ratchet protrusion 97 and a second ratchet protrusion 99 of the multi-turn adjustment knob 27 contact ribs 392 (FIG. 3a) of the indicator cylindrical sleeve 37. The ribs of the indicator cylindrical sleeve 37 generally run parallel to the axis 49. When the first ratchet protrusion 97 passes over one of the ribs of the indicator cylindrical sleeve 37, for example, as the multi-turn adjustment knob 27 is rotated, rotational force is applied to the rib of the indicator cylindrical sleeve 37. Additionally, a snapping sound and feel is achieved to thereby generate a "ratcheting" feel. The first and second ratchet protrusions 97, 99 thus create radial frictional and impact rotational forces for rotating the indicator cylindrical sleeve 37. Additionally, the first and second opposing protrusions 55, 57 apply balanced rotational forces to the indicator cylindrical sleeve 37.

FIG. 2 shows a top planar view of the module housing indicia surfaces 15. As shown in this figure, the first semi-circular extension 17 of the module housing 13, and the second semi-circular extension 19 of the modular housing 13, together, almost form a complete cylinder. These two semi-circular extension 17, 19, however, are separated by the two tracks 51, which accommodate the first and second opposing protrusions 55, 57 of the threaded shaft follower 53.

FIG. 3a shows a top plan view of the indicator cylindrical sleeve 37. The first and second indicator protrusions 43, 45 move along the indicia surfaces 15 of the module housing 13 to thereby indicate an approximation of pressure in either psi or bar. A cross-sectional view of the indicator cylindrical sleeve 37 is shown in FIG. 3b. The smooth lower band 111 of the indicator cylindrical sleeve 37 is located just above the first and second indicator protrusions 43, 45. The ribbed upper portions 392, which contact the first and second ratchet protrusions 97, 99 of the multi-turn adjustment knob 27 are located just above the smooth lower band 111 of the indicator cylindrical sleeve 37. As shown in FIG. 3b, the lower portion 92 of the first helix dial cam begins at an angular position, which is approximately the same angular position where the upper portion 95 of the first helix dial cam ends. Similarly, the second helix dial cam extends approximately one time around the indicator cylindrical sleeve 37 from a lower portion 73 to an upper portion 75.

Figure 5:
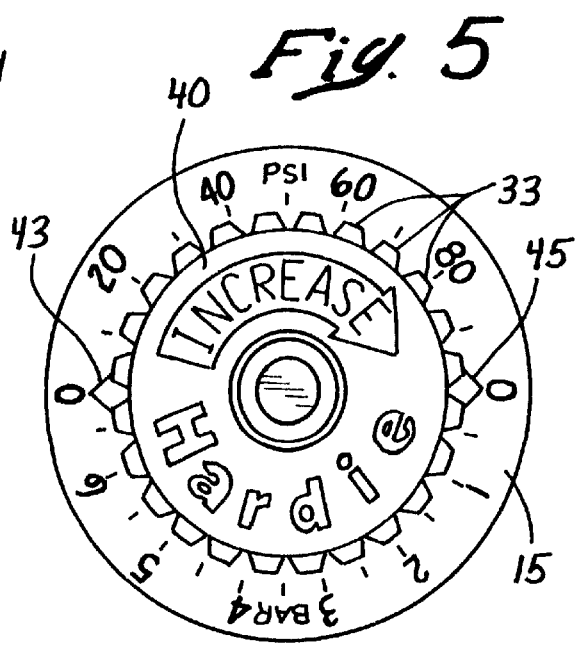
FIG. 5 is a top plan view of the mechanical simulated pressure gauge indicator of the presently preferred embodiment.

A cross-sectional view of the threaded shaft follower 53 is shown in FIG. 4a, and a top plan view of this threaded shaft follower 53 is shown in FIG. 4b. FIG. 5 shows a top plan view of the mechanical simulated pressure gauge indicator 11 of the presently preferred embodiment. The first indicator protrusion 43 moves along the upper hemisphere of the module housing indicia surfaces 15 according to rotations of the multi-turn adjustment knob 27, and the second indicator protrusion 45 moves along the lower hemisphere of the module housing indicia surfaces 15 according to the rotational position of the multi-turn adjustment knob 27. The first indicator protrusion 43 indicates psi approximations, and the second indicator protrusion 45 indicates bar pressure approximations.

Figure 6A:
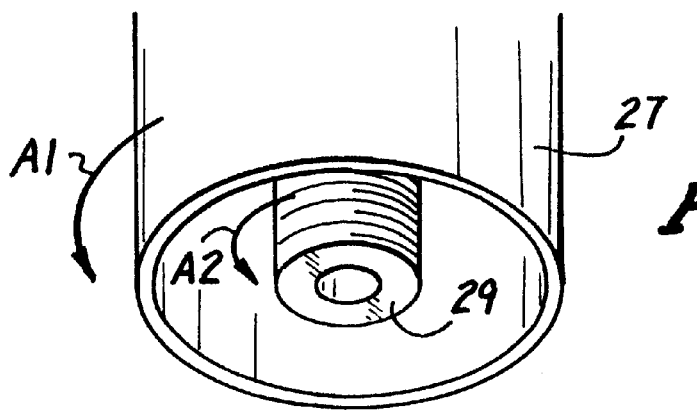
FIG. 6a is a schematic representation of the multi-turn adjustment knob and inter-threaded shaft of the present invention.
Figure 6B:
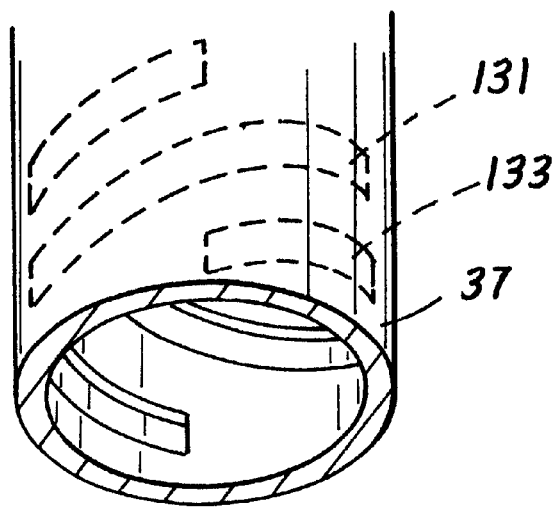
FIG. 6b is a schematic representation of the indicator cylindrical sleeve of the present invention.

FIG. 6a shows a schematic representation of a bottom perspective view of the multi-turn adjustment knob 27. The arrow A1 shows that clockwise rotation of the multi-turn adjustment knob 27 results in similar clockwise rotation of the inner-threaded shaft 29, which is indicated by the arrow A2. The indicator cylindrical sleeve 37, shown in FIG. 6b fits into the multi-turn adjustment knob 27. The first semi-circular extension 17 of the module housing 13 and the second semi-circular extension 19 of the module housing 13 are both shown in FIG. 6c (schematic shown cut approximately at level of shoulder 26 in FIG. 1).

Figure 6C:
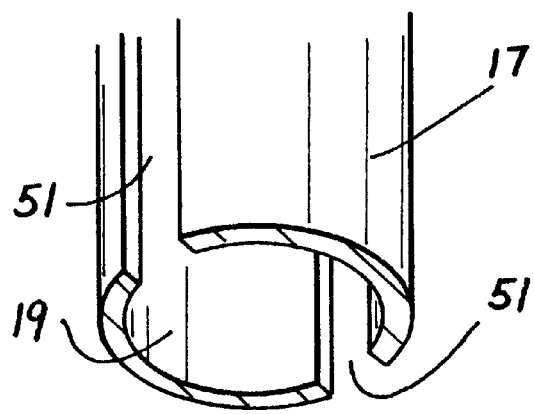
FIG. 6c is a schematic representation of the two semi-circular extensions of the module housing of the present invention.
Figure 6D:
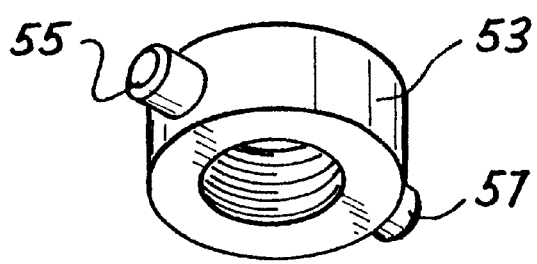
FIG. 6d is a schematic representation of the threaded shaft follower of the present invention.

Also shown in FIG. 6c are the two tracks 51, which are generally parallel to the axis of the threaded shaft follower 53. These first and second semi-circular extensions 17, 19 fit into the indicator cylindrical sleeve 37, and the threaded shaft follower 53 fits into the first and second semi-circular extension 17, 19. The first opposing protrusion 55 of the threaded shaft follower 53 fits into one of the tracks 51, and the second opposing protrusion 57 fits into the other track 51. These two opposing protrusions 55, 57 also fit into their respective first and second helix dial cams 131, 133.

FIG. 7 shows a partial assembly of the threaded shaft follower 53 into the first and second semi-circular extensions 17, 19 of the module housing 13. The first opposing protrusion 55 fits into a first of the tracks 51, and the second opposing protrusion 57 fits into a second one of the two tracks 51. Thus, when the inner-threaded shaft 29 rotates in a clockwise direction, for example, the threaded shaft follower 53 moves in an upward direction, and when the inner-threaded shaft is rotated in a counterclockwise direction, the threaded shaft follower 53 moves in a downward direction.

FIG. 8 shows the assembly of FIG. 7, with the indicator cylindrical sleeve 37 inserted thereover. The first helix dial cam 131 accommodates the first opposing protrusion 55, and the second helix dial cam 133 accommodates the second opposing protrusion 57. When the inner-threaded shaft 29 is rotated in a clockwise direction, the first opposing protrusion 55 of the threaded shaft follower 53 moves in the upward direction, and this upward direction of the first opposing protrusion 55 causes the indicator cylindrical sleeve 37 to move in the direction of Arrow A4. The upward movement of the first opposing protrusion 55 is indicated by the Arrow A3.

FIG. 9 illustrates the assembly of FIG. 8 with the outer cylindrical sleeve 31 of the multi-turn adjustment knob 27 inserted thereover. The outer cylindrical sleeve 31 is moved in the direction of arrow A1, for example, as is the inner-threaded shaft 29. The movement of the inner-threaded shaft 29 in the direction of Arrow A1 causes the first opposing protrusion 55 to move in the direction of Arrow A3 within the track 51. As the first opposing protrusion 55 moves in the direction of Arrow A3, a rotational force is exerted on the indicator cylindrical sleeve 37 to cause the indicator cylindrical sleeve 37 to move in the direction of A4 as the first opposing protrusion 55 moves along the first helix dial cam 131.

Although an exemplary embodiment of the invention has been shown and described, many other changes, modifications and substitutions, in addition to those set forth in the above paragraph, may be made by one having ordinary skill in the art without necessarily departing from the spirit and scope of this invention.

I claim:

1. A mechanical pressure indicator for indicating fluid pressure downstream of a fluid control valve, comprising:
    a housing having indicia disposed thereon, the indicia corresponding to specific fluid pressures;
    a multi-turn adjustment knob for adjusting the fluid pressure, the multi-turn adjustment knob having a threaded inner shaft, the multi-turn adjustment knob being rotatable in a clockwise direction and in a counterclockwise direction over a range of positions corresponding to the indicia disposed on the housing;
    a threaded shaft follower fitting around the threaded inner shaft of the multi-turn adjustment knob, the threaded shaft follower having two opposing protrusions extending radially from the threaded shaft follower;
    two tracks formed on the housing of the mechanical pressure indicator and extending in a direction which is generally parallel to the threaded inner shaft, for accommodating the two opposing protrusions of the threaded shaft follower and for preventing the threaded shaft follower from rotating, relative to the housing, when the multi-turn adjustment knob is rotated in one of the clockwise direction and the counterclockwise direction; and
    an indicator cylindrical sleeve fitting around the threaded shaft follower, the indicator cylindrical sleeve having an outer surface with at least one indicator protrusion positioned on the outer surface, a position of the at least one indicator protrusion, relative to the housing, being dependent on the position of the multi-turn adjustment knob, which in turn corresponds to a fluid pressure within a range defined by the specific indicia disposed on the housing, the indicator cylindrical sleeve having an inner surface with a double-start helix groove cam positioned on the inner surface of the indicator cylindrical sleeve, the double-start helix groove cam accommodating the two opposing protrusions of the threaded shaft follower,
    wherein rotation of the multi-turn adjustment knob causes the two opposing protrusions of the threaded shaft follower to move within the two tracks in the direction which is generally parallel to the threaded inner shaft,
    wherein movement of the threaded shaft follower in the direction which is generally parallel to the threaded inner shaft causes the two opposing protrusions to move within the double-start helix groove cam, and
    wherein movement of the two opposing protrusions within the double-start helix groove cam causes the indicator cylindrical sleeve to rotate, the at least one indicator protrusion on the indicator cylindrical sleeve cooperating with the indicia on the housing to indicate the fluid pressure.

2. The mechanical pressure indicator according to claim 1, wherein the two tracks allow the threaded shaft follower to travel in a first direction along the threaded inner shaft when the multi-turn adjustment knob is rotated in the clockwise direction, and
    wherein the two tracks allow the threaded shaft follower to travel in a second direction along the threaded inner shaft when the multi-turn adjustment knob is rotated in the counterclockwise direction.

3. The mechanical pressure indicator according to claim 2, wherein the at least one indicator protrusion comprises two indicator protrusions located opposite one another on the indicator cylindrical sleeve.

4. The mechanical pressure indicator according to claim 3, wherein the two indicator protrusions move above two corresponding semi-circular pressure scales, and wherein a position of each of the two indicator protrusions, above a corresponding semi-circular pressure scale, indicates the fluid pressure.

5. A mechanical pressure indicator adapted for use with a valve for controlling the pressure of a fluid within a range of pressures, and for providing an indication of the specific pressure of the fluid within the range of pressures, comprising:

a housing having indicia thereon displaying the range of pressures of the fluid;

an adjustment knob having a threaded inner shaft and being rotatable relative to the housing to adjust the pressure of the fluid to the specific pressure;

a threaded shaft follower disposed in threaded engagement with the inner shaft, the shaft follower including two opposing projections;

two tracks formed on the housing of the mechanical pressure indicator and extending in a direction which is generally parallel to the threaded inner shaft, for accommodating the two opposing protrusions of the threaded shaft follower and for preventing the threaded shaft follower from rotating, relative to the housing, when the adjustment knob is rotated;

a cylindrical sleeve having an indicator and being disposed outwardly of the shaft follower, the sleeve defining a double-start helix groove adapted to receive the opposing projections of the follower and to facilitate rotation of the sleeve in response to rotation of the knob; and the cylindrical sleeve being positioned relative to the housing such that the indicator on the sleeve indicates the specific pressure of the fluid among the range of pressures displayed by the indicia on the housing.

6. The mechanical pressure indicator recited in claim 5 wherein the adjustment knob is moveable in a first angular displacement and the cylindrical sleeve is moveable in a second angular displacement in response to movement of the adjustment knob, the second angular displacement of the sleeve being less than the first angular displacement of the knob.

7. A mechanical pressure indicator adapted for use with a valve for controlling the pressure of a fluid within a range of pressures, and for providing an indication of the specific pressure of the fluid within the range of pressures, comprising:

a housing having indicia thereon displaying the range of pressures of the fluid;

an adjustment knob having a threaded inner shaft and being rotatable relative to the housing to adjust the pressure of the fluid to the specific pressure;

a threaded shaft follower disposed in threaded engagement with the inner shaft, the shaft follower including two opposing projections;

two tracks formed on the housing of the mechanical pressure indicator and extending in a direction which is generally parallel to the threaded inner shaft, for accommodating the two opposing protrusions of the threaded shaft follower and for preventing the threaded shaft follower from rotating, relative to the housing, when the multi-turn adjustment knob is rotated;

a cylindrical sleeve having an indicator and being disposed outwardly of the shaft follower, the sleeve defining a double-start helix groove adapted to receive the opposing projections of the follower and to facilitate rotation of the sleeve in response to rotation of the knob;

the cylindrical sleeve being positioned relative to the housing such that the indicator on the sleeve indicates the specific pressure of the fluid among the range of pressures displayed by the indicia on the housing; and at least two ratchet protrusions connected to the adjustment knob and adapted to contact the cylindrical sleeve in order to facilitate rotation of the cylindrical sleeve relative to the housing in response to rotation of the adjustment knob.

* * * * *